(12) United States Patent
Lee

(10) Patent No.: US 6,376,946 B1
(45) Date of Patent: Apr. 23, 2002

(54) D.C. BRUSHLESS AIR FAN WITH AN ANNULAR OIL TROUGH

(76) Inventor: Bill Lee, No. 148, Tai-Ho Rd., Chu-Pei City, Hsin-Chu Hsien (TW)

(*) Notice: Subject to any disclaimer, the term of this patent is extended or adjusted under 35 U.S.C. 154(b) by 0 days.

(21) Appl. No.: 09/934,830

(22) Filed: Aug. 23, 2001

(51) Int. Cl.[7] .............................................. H02K 11/00
(52) U.S. Cl. ................. 310/67 R; 310/90; 310/DIG. 6; 310/254
(58) Field of Search .................. 310/67 R, 90, 310/261, 267, 88, 259, 217, 218, 194

(56) References Cited

U.S. PATENT DOCUMENTS

| | | | | |
|---|---|---|---|---|
| 3,961,864 A | * | 6/1976 | Papst et al. ................. | 417/354 |
| 4,128,364 A | * | 12/1978 | Papst et al. ................. | 417/354 |
| 4,130,770 A | * | 12/1978 | Wrobel ........................ | 310/67 |
| 4,682,065 A | * | 7/1987 | English et al. ................ | 310/90 |
| 4,686,400 A | * | 8/1987 | Fujisaki et al. ............... | 310/67 |
| 5,013,957 A | * | 5/1991 | Wrobel ........................ | 310/217 |
| 5,170,086 A | * | 12/1992 | Wrobel et al. ............... | 310/217 |
| 5,245,236 A | * | 9/1993 | Horng ......................... | 310/67 |

* cited by examiner

Primary Examiner—Nestor Ramirez
Assistant Examiner—Heba Elkassabgi
(74) Attorney, Agent, or Firm—Bacon & Thomas, PLLC

(57) ABSTRACT

An improved D.C. brushless air fan comprises a rotor, a stator and a casing. The rotor has vanes mounting to a spindle and has a juncture with an oil cap located at the juncture. The oil cap has an annular oil trough to prevent oil from spinning out. The stator has a lower insulation plate which has inverse hooks formed in diagonal fashion. The casing has a center strut and latch sections symmetrical about the axis of the strut matching and engageable with the inverse hooks. The latch sections have axial grooves extending to the bottom thereof.

3 Claims, 3 Drawing Sheets

D.C. BRUSHLESS AIR FAN WITH AN ANNULAR OIL TROUGH

FIELD OF THE INVENTION

This invention relates to a D.C. brushless air fan and particularly a D.C. brushless air fan that offers has high quality, no dead points, and is oil leak-proof and no maintenance.

BACKGROUND OF THE INVENTION

With rapid developments and innovations of electronic products, particularly in computer industry, heat generation and dissipation problem of electronic elements has become a critical and important issue. D.C. brushless air fans are widely used to attack this problem, especially personal computers (note book computers), cars, household appliances, audio products, and many popular and fashionable electronic products such as VCD, DVD, etc.

D. C. brushless air fans are especially suitable for electronic products because of their simple structure, small size and using convenience. However there are still problems and deficiencies unresolved. For instance, the production processes of D. C. brushless air fans are still too complicated and result in higher costs of production. Lubrication oil contained in the spindle tends to spin away under high speed rotation and may result in not enough lubrication oil after operating a period of time, and will generate excessive heat in the allowance between the spindle and bearing, and become not operating properly. Moreover, there are dead points in the air fans that could cause the air fans not be able to start initially. Whenever these problems happen, it needs professional technicians to do maintenance. It hinders users' operations, and causes a lot of losses in human and material resources. There are still rooms for improvements.

SUMMARY OF THE INVENTION

The primary object of the invention is to resolve the foregoing disadvantages. The invention comprises a rotor, a stator and a casing. The rotor includes a spindle coupled with vanes, and a magnetic bushing and adhesive magnet located in the vanes. The stator includes a ferrite core housed an oil-retained bearing, an upper and a lower insulation plate located respectively at an upper and a lower end of the ferrite core. The lower insulation plate includes a hollow and a solid snap ring and a circuit board. The casing has a center strut with a cavity formed therein. The spindle is coupled with an oil cap which has an annular oil trough to prevent oil from spinning out and leaking. The lower insulation plate has inverse hooks formed in diagonal fashion to engage with latch sections formed symmetrically about the axis of the center strut. The latch sections have axial grooves directing toward the bottom.

The foregoing, as well as additional objects, features and advantages of this invention will be more readily apparent from the following detailed description, which proceeds with reference to the accompanying drawings.

DESCRIPTION OF THE PREFERRED EMBODIMENT

Figure 1:
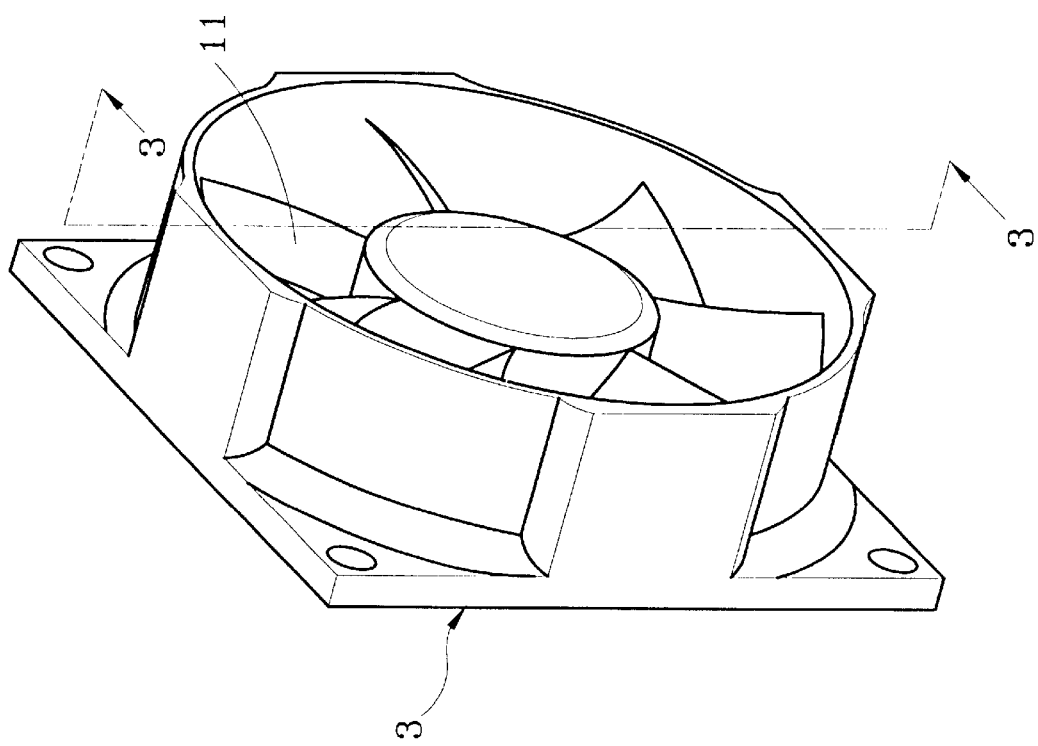
FIG. 1 is a perspective view of the invention.
Figure 2:
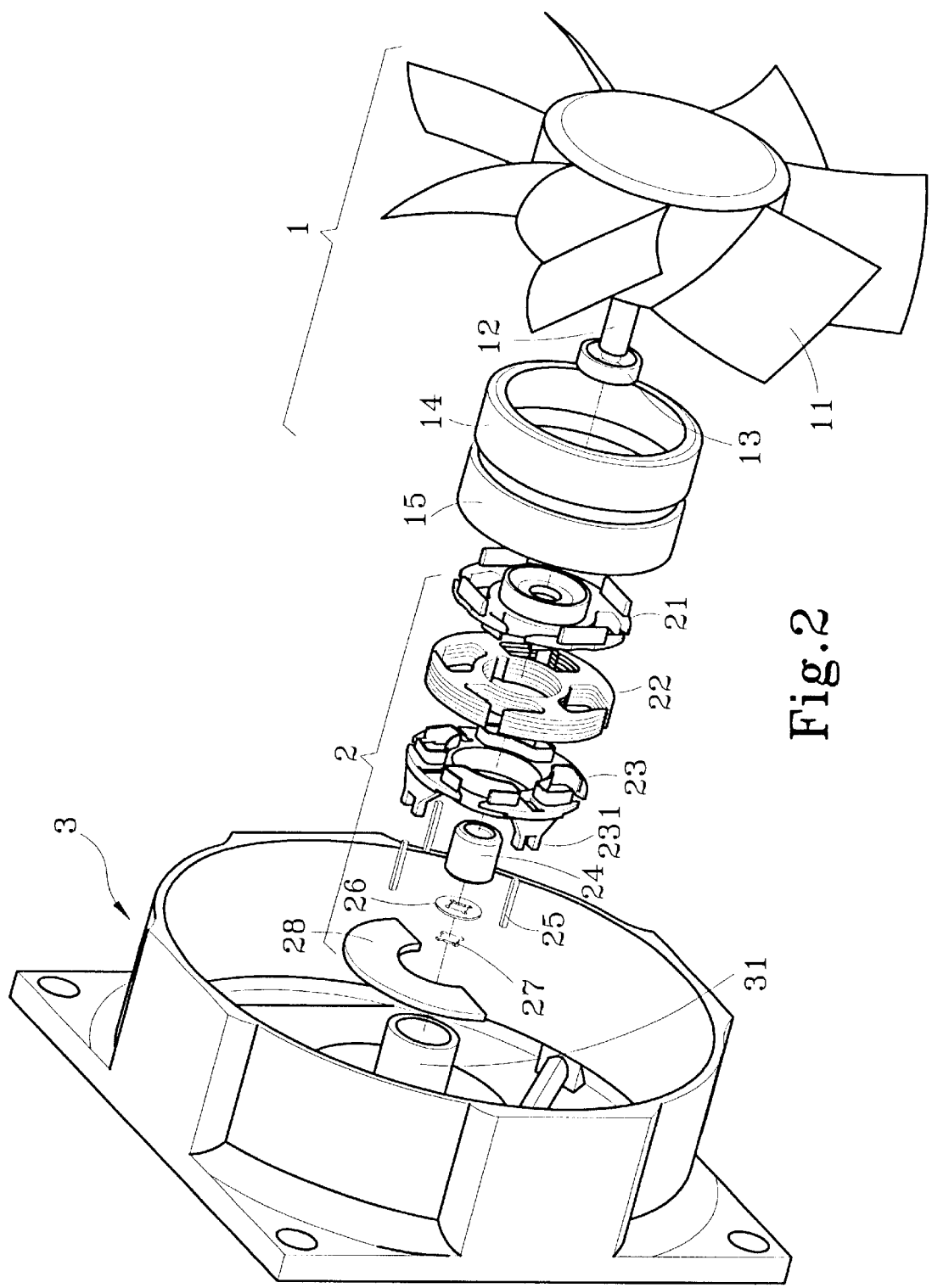
FIG. 2 is an exploded view of the invention.
Figure 3:
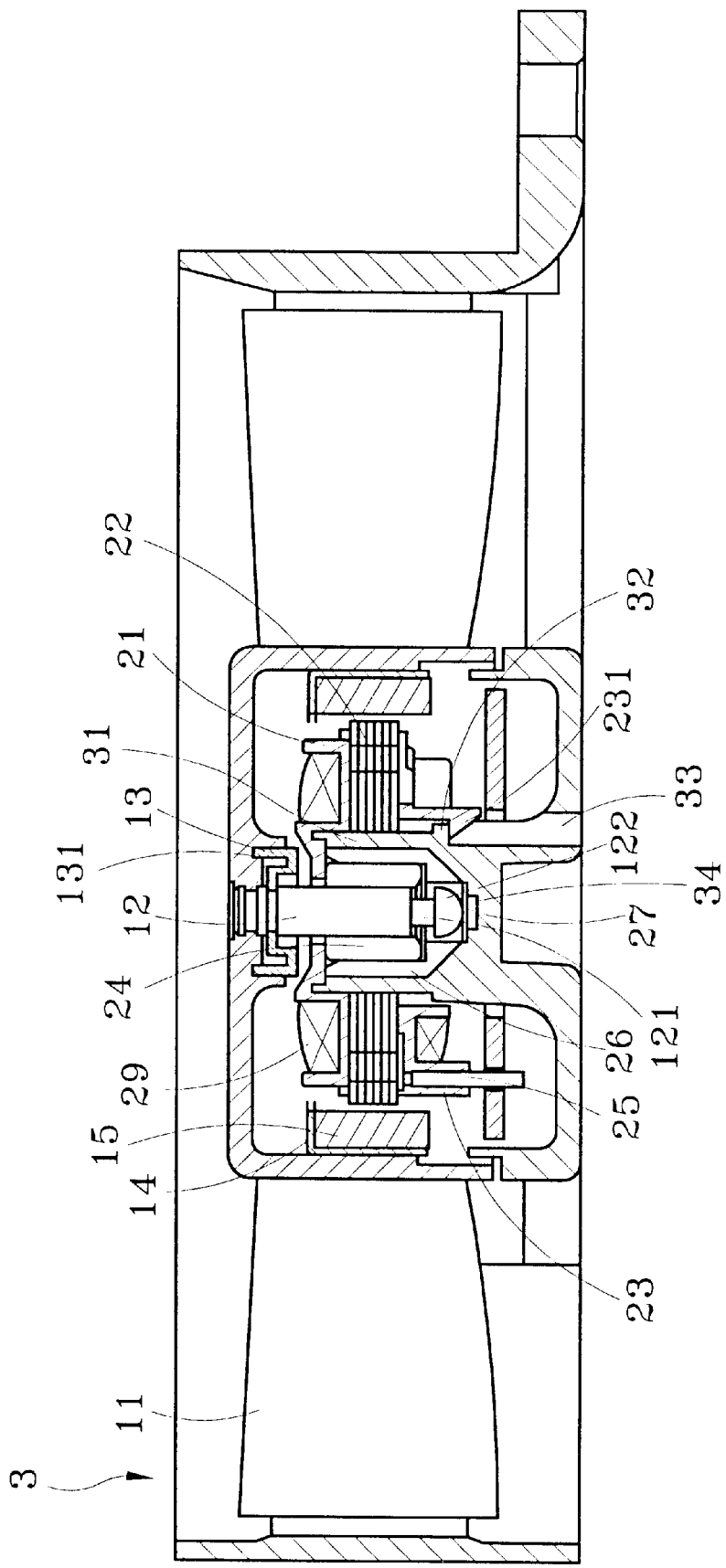
FIG. 3 is a sectional view taken along line 3—3 in FIG. 1.

Referring to FIGS. 1, 2 and 3, the D.C. brushless motor of the invention consists of a rotor 1 coupled with a stator 2 and housed in a casing 3 to become a high quality, no dead points, oil leak-proof and maintenance free brushless motor.

The rotor 1 includes vanes 11 mounted to a spindle 12 with an oil cap 13 located at the juncture of the vanes 11 and the spindle 12. Inside the vanes 11, there is a magnetic bushing 14 coupled with an adhesive magnet 15. The oil cap 13 has an annular oil trough 13 to prevent oil from spinning out.

The stator 2 includes a ferrite core 22 contained an oil-retained bearing 24. There is an upper insulation plate 21 and a lower insulation plate 23 located respectively on the upper end and the lower end of the ferrite core 22. In the lower insulation plate 23, there is a hollow snap ring 26, a solid snap ring 27 and a circuit board 28. The lower insulation plate 23 further has inverse hooks 231 formed in diagonal fashion . The circuit board 28 is formed in a semi-circular shape. The ferrite core 22 further has a winding resistor 29 linked to the circuit board 28 through brass pins 25.

The casing 3 has a center strut 31 in the center. The center strut 31 has a cavity 34 formed on the bottom thereof. The center strut 31 also has latch sections 32 formed symmetrically about the axis of the center strut 31 to engage with the inverse hooks 231. There are also grooves 33 formed axially along the latch sections 32 for disengaging the inverse hooks 231 from the latch sections 32 when desired.

Referring to FIGS. 2 and 3, for assembling the D.C. brushless air fan of the invention, first, dispose the solid snap ring 27 into the cavity 34 of the center strut 31, then dispose the hollow snap ring 26 into the cavity 34, then dispose the oil-retained bearing 24 into the cavity 34. Then mount the stator 2 to the center strut 31 around the periphery of the center strut 31, and engage the inverse hooks 231 of the lower insulation plate 23 with the latch sections 32 of the center strut 31. Finally install the rotor 1 to make the oil trough 131 of the oil cap 13 matching the oil-retained bearing 24, and push the spindle 12 of the rotor I to make a pointed end 122 of the spindle 12 passing through the hollow snap ring 26 to allow the snap ring engaging with an indented recess 121 formed on the spindle 12. Thus the whole structure of the D.C. brushless air fan becomes more stable and secured. As the oil cap 13 has an annular oil trough 131 which can prevent oil from spinning out or leaking, the D.C. brushless air fan thus constructed offers better quality, no dead points, is oil leak-proof and maintenance free.

What is claimed is:

1. A D.C. brushless air fan providing high quality, oil leak-proof, no dead points, and no maintenance, comprising:

a rotor including vanes mounting to a spindle, the vanes including a magnetic bushing coupled with an adhesive magnet;

a stator including a ferrite core which houses an oil-retained bearing, an upper end and a lower end which attach respectively to an upper insulation plate and a lower insulation plate; the lower insulation plate a circuit board mounted thereon; and a casing having a center strut in the center thereof, the cavity having a hollow snap ring and a solid snap ring; the center strut having a cavity formed on the bottom thereof; wherein an oil cap is provided and located at the juncture of the vanes and the spindle, the oil cap having an annular oil trough to prevent oil from spinning out, the lower insulation plate having inverse hooks formed in diagonal fashion, the center strut having symmetrical latch sections matching and engageable with the inverse hooks, the latch sections having axial grooves extending axially towards the bottom thereof.

2. The D.C. brushless air fan of claim 1, wherein the circuit board is formed in a semi-circular shape.

3. The D.C. brushless air fan of claim 1, wherein the ferrite core further has a winding resistor linked to the circuit board through brass pins.

\* \* \* \* \*